(No Model.)

E. & L. SHAY.
HOSE CART.

No. 521,868. Patented June 26, 1894.

Witnesses:

Inventors
E. Shay
L. Shay
By W. H. Bartlett
Attorney.

UNITED STATES PATENT OFFICE.

EPHRAIM SHAY AND LETTE SHAY, OF HARBOR SPRINGS, MICHIGAN.

HOSE-CART.

SPECIFICATION forming part of Letters Patent No. 521,868, dated June 26, 1894.

Application filed March 26, 1894. Serial No. 505,093. (No model.)

*To all whom it may concern:*

Be it known that we, EPHRAIM SHAY and LETTE SHAY, residing at Harbor Springs, State of Michigan, have invented certain new and useful Improvements in Hose-Carts, of which the following is a specification, reference being had therein to the accompanying drawings.

This invention relates to hose carts.

The object of the invention is to produce a hose cart in which the body shall be hung low, below the axle, and balanced whether the cart be loaded or empty; also to produce a cart of special construction from which two lines of hose may be laid conveniently at one operation; also to improve parts of a hose cart.

Figure 1:
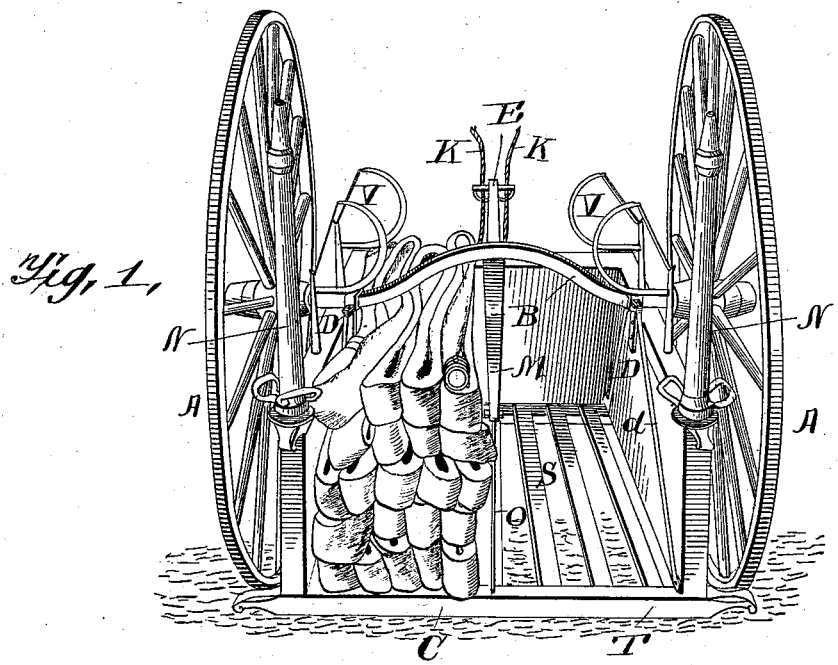
Figure 2:
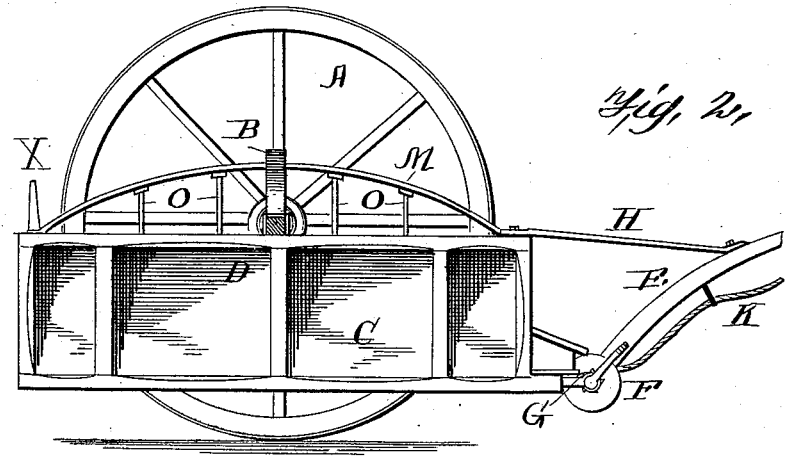

Figure 1 is a rear perspective of the cart, showing the hose faked in one side of the body, and the other side empty. Fig. 2 is a side elevation with one wheel removed.

The wheels A, A, are of any usual character for carts of this character. The axle, B, curves upward, and arches across the body, C, which body is suspended from the axle, near the wheels, by clips D, D, and is held by braces d, at the sides. A light tongue, E, is attached to the front of the cart, and rope reels F, are attached near said tongue, so that the drag ropes, K, may run out forward along the tongue and extend in front thereof, if desired. The ropes may be kept from unwinding by ratchet and pawl connections G. The tongue is braced from the box or body by brace H. The tongue may be used for the attachment of horses by a suitable arrangement of whiffletrees. The cart body hangs so low, and the weight of the tongue is relatively so light, that the body will not be swung down by the weight of the tongue, whether the cart be full or empty, and no legs are required to hold the body horizontal. The box or body of the cart is preferably rectangular, as shown, and the bottom thereof preferably consists of slats extending lengthwise, and at such distance apart as may be necessary to prevent the sections of hose from passing between. The body may thus be made strong and light. The body of the cart is preferably divided by a vertical partition. This partition as shown consists of a light bow or frame piece, M, extending from front to rear of the body, and attached or connected to the axle, and to the front of the body. The vertical partition is made up preferably of upright rods O, O, which extend from the bottom slats to the frame piece M. The rear end of the box or body is preferably open, and the upper faces of longitudinal slats S are on a plane with the rear cross bar T of the box or body. The box or body has standards or beckets, X, on which the nozzles N are or may be supported. Brackets V, V, are attached to the body or to the axle, for the purpose of attaching any spare parts which may be desired.

The hose is stored in the cart body in longitudinal fakes, as shown in Fig. 1. When desirable to lay a line of hose, the end of the hose can be attached to a fire plug or any fixed object, and the cart drawn away therefrom. This will pull the fakes of hose from the rear of the cart. If desirable to lay two lines of hose in the shortest time, both hose can be attached to the fixed position, (plug or otherwise) and both lines will be drawn from the cart at once.

As hose sections are usually provided with a male screw thread at one end, and a female screw thread at the other end, it is important that the hose sections be laid in the proper relation to the fire plugs, to avoid the need of reversal. By arranging the hose sections properly in the cart, the hose sections may present either the male or female thread as the first end of the hose sections, and the work may be done accordingly.

It will be understood that the hose body is not necessarily rectangular, and that other changes may be made without departing from our invention.

What we claim is—

1. The hose cart having the body hung below the axle, and having a drag attachment at the front end, connected to the body, so balanced that the body will swing in about horizontal position and support the drag tongue, substantially as described.

2. In a hose cart the wheels with the bowed axle, the rectangular body suspended from said axle at the sides, the tongue and drag ropes connected to the front of the body, and the nozzle supports at the rear of the body, all combined and relatively arranged substantially as described.

3. In a hose cart, the wheels, the curved axle and body hung beneath the same, and the vertical partition extending lengthwise of the body and connected to said axle the rear end of the body being open for the delivery of fakes of hose from either side, substantially as described.

4. In a hose cart, the wheels, the curved axle, the body suspended at the sides from the curved axle, braces connecting the body to the axle, and a partition composed of vertical rods connected to a bow piece, which piece is attached to the front of the body and to the axle, all substantially as described.

In testimony whereof we affix our signatures in presence of two witnesses.

EPHRAIM SHAY.
LETTE SHAY.

Witnesses:
 JOB ROHR,
 RUSSELL A. LEE.